US005276825A

United States Patent [19]

Blomgren et al.

[11] Patent Number: 5,276,825

[45] Date of Patent: Jan. 4, 1994

[54] APPARATUS FOR QUICKLY DETERMINING ACTUAL JUMP ADDRESSES BY ASSUMING EACH INSTRUCTION OF A PLURALITY OF FETCHED INSTRUCTIONS IS A JUMP INSTRUCTION

[75] Inventors: James S. Blomgren; Tuan Luong; Winnie Yu, all of San Jose, Calif.

[73] Assignee: Chips & Technologies, Inc., San Jose, Calif.

[21] Appl. No.: 667,942

[22] Filed: Mar. 12, 1991

[51] Int. Cl.[5] .................... G06F 9/38

[52] U.S. Cl. .................... 395/375; 364/938; 364/938.1; 364/938.2; 364/938.3; 364/DIG. 2; 364/261.3; 364/261.4; 364/261.5; 364/261.7

[58] Field of Search .................... 395/375, 800

[56] References Cited

U.S. PATENT DOCUMENTS

| | | | |
|---|---|---|---|
| 4,471,433 | 9/1984 | Matsumoto et al. | 395/375 |
| 4,725,947 | 2/1988 | Shonai et al. | 395/375 |
| 4,827,402 | 5/1989 | Wada | 395/375 |
| 4,916,602 | 4/1990 | Itoh | 395/375 |
| 4,953,121 | 8/1990 | Muller | 395/375 |
| 4,984,154 | 1/1991 | Hanatani et al. | 395/375 |
| 4,991,080 | 2/1991 | Emma et al. | 395/375 |
| 5,008,807 | 4/1991 | Krueger et al. | 95/375 |
| 5,099,419 | 3/1992 | Nomura | 395/375 |
| 5,142,634 | 8/1992 | Fite et al. | 395/375 |

*Primary Examiner*—Thomas C. Lee
*Assistant Examiner*—Paul Harrity
*Attorney, Agent, or Firm*—Townsend and Townsend Khourie and Crew

[57] ABSTRACT

A method and apparatus for performing a fast jump address calculation is disclosed. A field from the instruction is provided to an adder, on the assumption that it is the displacement value, without actually determining whether it is a displacement value. A fixed instruction length is also provided to the adder, on the assumption that the instruction will have that length. Finally, the current instruction address bits from the program counter are provided to the adder. These are added together to provide a jump address.

20 Claims, 2 Drawing Sheets

| CYCLE | 1 | 2 | 3 | 4 | 5 | 6 | 7 |
|---|---|---|---|---|---|---|---|
| NORMAL ADDRESS PIPELINE | DECODE (D) | LINEAR ADDR. GENERATION (E) DETERMINE IF BRANCH TAKEN | LIMIT CHECK (E), PHYSICAL ADDR. GENERATION (S) | ADDR ON BUS (BIU) DEBUG CHECK (S) | DATA BACK FROM BUS (BIU) | DATA TO INSTR. BUFFER (I FETCH) | DECODE NEW INSTR. (D) |
| FAST JUMP ADDRESS PIPELINE | PRODUCE PHYSICAL ADDRESS | READ I CACHE, IF HIT, TO INSTR. BUFFER | DECODE NEW INSTR (D) | | | | |

FIG. 2

APPARATUS FOR QUICKLY DETERMINING ACTUAL JUMP ADDRESSES BY ASSUMING EACH INSTRUCTION OF A PLURALITY OF FETCHED INSTRUCTIONS IS A JUMP INSTRUCTION

BACKGROUND OF THE INVENTION

The present invention relates to methods and apparatus for calculating jump addresses in a microprocessor.

Before a jump to another location can be done, the instruction must be first decoded to determine that it is a jump instruction. A jump instruction will contain a displacement value, which may be one or more bytes. The instruction must be decoded to determine the number of bytes which belong to the displacement value. This displacement value is then added to the current instruction address to determine the location of the instruction being jumped to. The current instruction address is stored in a program counter register. In addition, the length of the instruction itself must be added to the jump address. This is because the program counter points to the beginning of the instruction, and a displacement indicates a value from the end of the instruction, so that the length of the instruction must be added to bridge the gap.

A jump may also be unconditional or conditional. If it is unconditional, it will always be taken. If it is conditional, an operation designated by the instruction must be first performed to determine whether the jump is to be taken. This is typically done in an execution stage of the microprocessor logic following the decoding stage.

Finally, the calculated jump address must be converted into a physical address. In some systems, the memory may be segmented so that a constant value indicating the segment must be added to the address. This is often called a virtual (or effective) address to linear address conversion. In addition, the memory system may use paging, which would further break up the segments of memory. Certain high order bits designate the page, and must be translated into the actual physical address in order to fetch the instruction from memory. The address after the segmentation calculation and before the paging calculation is sometimes called a linear address, an intermediate address between the virtual and physical addresses.

In some programs, approximately 25% of the instructions may be jump instructions. These jump instructions may take as many as nine cycles for execution. Accordingly, it is desirable to reduce the number of cycles required to execute a jump in order to increase the speed of processing.

SUMMARY OF THE INVENTION

The present invention provides a method and apparatus for performing a fast jump address calculation. A field from the instruction is provided to an adder, on the assumption that it is the displacement value, without actually determining whether it is a displacement value. A fixed instruction length is also provided to the adder, on the assumption that the instruction will have that length. Finally, the current instruction address bits from the program counter are provided to the adder. These are added together to provide a jump address.

The particular instruction length and instruction displacement value chosen correspond to the most commonly occurring instruction format. A normal jump instruction calculation is done in parallel, and its value of a jump address is used if it is determined that the instruction length or displacement size are different than what was assume. Otherwise, the more quickly calculated instruction jump address is used. In one embodiment, for 80286 applications, the typical instruction is two bytes long with a one byte displacement value.

In a preferred embodiment, the calculated jump address is provided to an on-chip instruction cache. The use of an instruction cache avoids the need in most cases of doing a bus access, thereby further crowding the bus with a fetch which may not in fact be used if it is determined that the instruction is other than two bytes with a one byte displacement. The instruction cache is preferably accessed with physical addresses, so that it may also be accessed by DMA operations. This requires that there be a calculation of the proper page. This is done by using the page from the previous instruction, which is stored in a register. This page is provided with the translated jump address to the instruction cache. In the event that there is a transition to another page, the access is invalidated, and the normally calculated jump address is used. The transition to another page is detected by monitoring for a borrow or carry in the adder in adding the displacement value and instruction length to the current instruction address.

For a fuller understanding of the nature and advantages of the invention, reference should be made to the ensuing detailed description taken in conjunction with the accompanying drawings.

BRIEF DESCRIPTION OF THE DRAWINGS

FIG. 2 is a timing diagram illustrating the timing of the present invention;

DESCRIPTION OF THE SPECIFIC EMBODIMENT(S)

Figure 1:
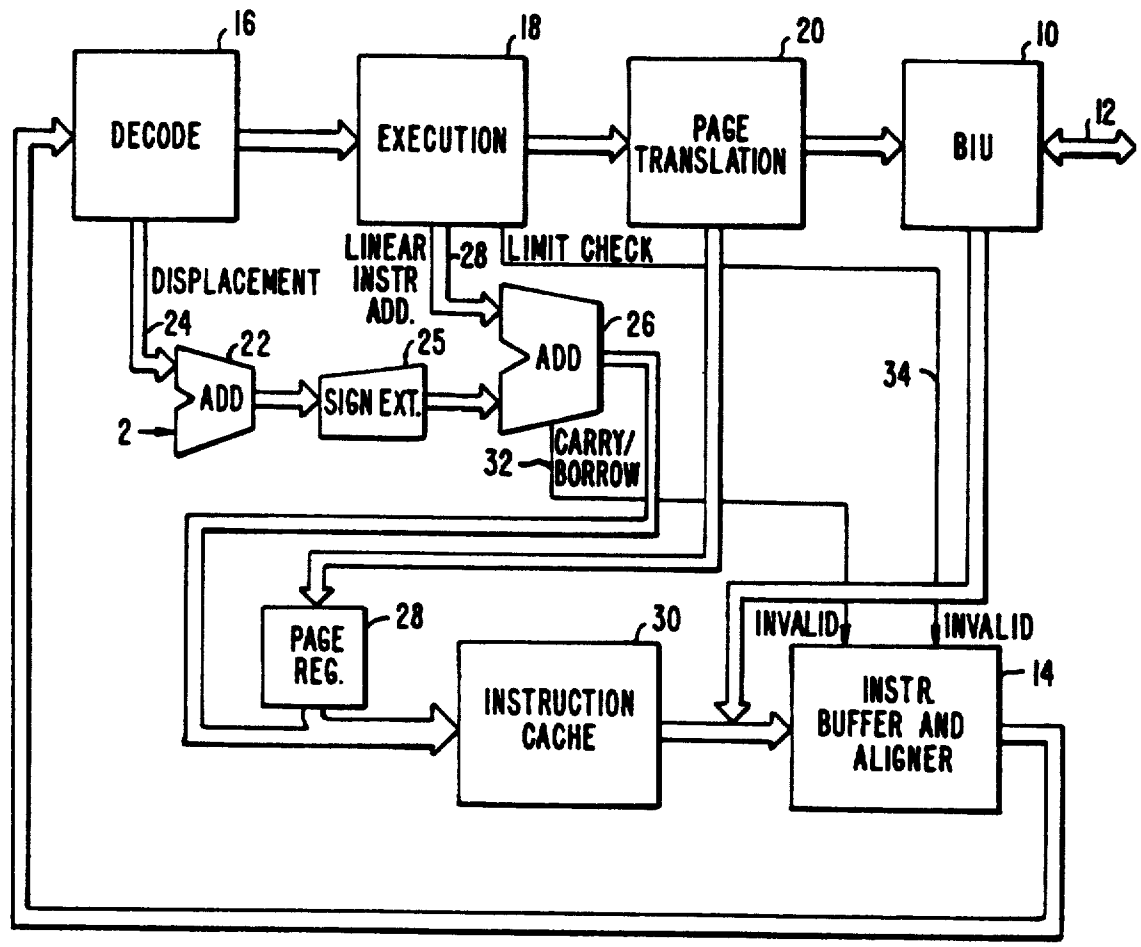
FIG. 1 is a block diagram of the fast jump instruction calculation logic of the present invention.

FIG. 1 is a block diagram of a preferred embodiment of the fast jump logic of the present invention. A bus interface unit 10 fetches instructions along a bus 12 from memory and provides them to an instruction buffer and aligner 14. Instruction buffer and aligner 14 stores the instruction and aligns it so that the beginning of the instruction is at the proper location. Each instruction is then provided to decode logic 16 which decodes the instruction to determine what operations the instruction requires to be done. An execution logic block 18 performs the operations indicated by the instructions using an internal ALU (arithmetic logic unit). If the instruction requires the fetching of data from memory, or a jump to another instruction, the proper segment is determined by execution unit 18 and a page translation block 20 calculates the proper page for the memory address. The physical memory address is provided to bus interface unit 10, and the process is repeated.

According to the present invention, a parallel jump address calculation path is started by an adder 22. One input to adder 22 is provided on bus 24 from decode logic 16. Bus 24 is coupled to the low order byte of the instruction on the assumption that this will be the displacement value, and that the displacement value will be one byte long. The fixed value of 2 is supplied as the other input to adder 22, on the assumption that the instruction length will be two bytes. The output of adder 22 is provided to sign extension logic 25. Sign extension will be performed if the output is a negative value. The resulting value is provided to another adder 26 which combines the calculated value with a portion of the bits of the current instruction address on a bus 28 from the program counter in execution unit 18.

The output of adder 26 is combined with the current page as stored in a page register 28 and provided as an input to an instruction cache 30. The contents of the instruction cache will be provided to instruction buffer and aligner 14 as the instruction jumped to.

If a carry or a borrow is performed by adder 26, that indicates that the resulting address is outside of the previous page stored in page register 28. In that case, a carry/borrow signal on a line 32 is provided to instruction buffer 14 to invalidate the instruction pointed to. The invalidation is done by simply not latching the instruction into instruction buffer 14. In addition, a limit check signal on a line 34 is provided to invalidate an instruction in the event that execution unit 18 determines that the address is outside of the current segment.

In parallel with the fast calculation by the dedicated logic shown and discussed above in FIG. 1, the jump address is also calculated in the normal manner using decode logic 16, execution logic 18 and page translation logic 20. In the event it is determined that the instruction is other than two bytes long or has a displacement other than one byte or is at a location other than the low order byte, the selected entry in instruction cache 30 will be invalidated. Thus, for example, if there is a prefix added to the instruction or if it is a four byte or single byte instruction, the result will be invalidated. By restricting the fast jump logic to only calculate the new address within a page, the size of the adders is significantly reduced and the speed is increased. The fast jump logic is blind to whether there is actually a jump or not, whether the jump is conditional, and whether a displacement is in the assumed location and the instruction has the assumed length. By making these assumption, great speed can be obtained. The invention also takes advantage of the existing logic to do the limit check and the page calculation. This eliminates the need for larger amounts of additional logic for the dedicated fast jump hardware.

FIG. 2 illustrates the timing of the present invention. The first row illustrates the timing sequence for the progress through decode block 16, execution block 18, segmentation block 20 and BIU 10. The second row illustrates the progress through the dedicated fast jump hardware. In cycle one in the first row, the instruction is decoded. In some architectures, two cycles may be required for decoding. In the second cycle, the linear address is generated and it is determined whether a branch is taken in execution block 18. In a third cycle, a limit check is performed in execution block 18 on the calculated address and the physical address is generated by page translation block 20. This includes the jump address for a jump instruction. In the fourth cycle, the address is presented to the bus by bus interface unit 10. In the fifth cycle, data is received back from the bus by BIU 10. In the sixth cycle, the data is provided to the instruction buffer in the aligner 14. Finally, in the seventh cycle, the new instruction is decoded in decode logic 16.

The second row of FIG. 2 shows the fast jump calculation of the present invention. In the first cycle, the physical address is produced and provided to instruction cache 30. In the second cycle, the instruction cache is read and, if there is a hit, the instruction is provided to instruction buffer 14. In the third cycle, this new instruction is decoded. While the new instruction is being decoded in the third cycle, the execution unit, also in the third cycle, is doing limit checks necessary for that instruction. If the limit is exceeded, the decoding is aborted. If the limit is not exceeded, and the jump address has not been invalidated otherwise, the remaining cycles for that jump instruction (4–7) are not performed, and instead the new instruction proceeds with execution in execution unit 18 in the fourth cycle.

As will be understood by those familiar with the art, the present invention may be embodied in other specific forms without departing from the spirit or essential characteristics thereof. For example, the size of the jump instruction could be assumed to be three or four bytes rather than two. In addition, multiple dedicated fast jump hardware could be provided for two, three, four, six or any other number of byte instructions with a selection done later in the hardware upon a determination of the actual length of the instruction. Accordingly, the disclosure of the preferred embodiment of the invention is intended to be illustrative, but not limiting, the scope of the invention which is set forth in the following claims.

What is claimed is:

1. An apparatus for quickly determining actual jump addresses of taken jump instructions of a plurality of fetched instructions, comprising:

means for extracting a portion from each said fetched instruction, regardless of whether said fetched instruction is one of said jump instructions, said extracted portion representing an assumed displacement value;

means for storing at least a portion of a current instruction address;

means for providing a fixed assumed instruction length value;

means for adding said assumed displacement value, said fixed assumed instruction length value, and said at least a portion of a current instruction address to generate an assumed jump address;

means for decoding said fetched instruction to determine whether said fetched instruction is one of said jump instructions;

means for invalidating said assumed jump address if said decoding means determines that said fetched instruction is not one of said jump instructions;

means for determining an actual instruction length value and an actual displacement value if said decoding means determines that said fetched instruction is one of said jump instructions;

means for comparing said actual instruction length value and said actual displacement value to said fixed assumed instruction length value and said assumed displacement value, respectively;

means, responsive to said comparing means, for invalidating said assumed jump address if said actual instruction length value and said actual displacement value are not equal to said fixed assumed instruction length value and said assumed displacement value, respectively; and means, responsive to said comparing means, for using said assumed jump address as the actual jump address if said actual instruction length value and said actual displacement value are equal to said fixed assumed instruction length value and said assumed displacement value, respectively.

2. The apparatus of claim 1 wherein said means for adding comprises:

a first adder for adding said assumed displacement value and said fixed assumed instruction length value to give a total value; and a second adder for adding said total value and said current instruction address.

3. The apparatus of claim 2 further comprising means for performing sign extension on said total value.

4. The apparatus of claim 1 further comprising means for determining if a jump will be taken and invalidating said assumed jump address if said jump is not taken.

5. The apparatus of claim 1 further comprising an instruction cache, an assumed jump address output of said means for adding being coupled as an input to said instruction cache.

6. The apparatus of claim 1 further comprising:

means for determining a physical page of said current instruction address;

means for storing said physical page; and means for combining said physical page from said means for storing to a jump address output of said means for adding.

7. The apparatus of claim 6 further comprising means for invalidating said assumed jump address if there is a carry or borrow generated by said means for adding, indicating that said assumed jump address is in a different physical page from the page stored in said means for storing a physical page.

8. The apparatus of claim 1 further comprising:

means for fetching an instruction from a memory at said assumed jump address; and an instruction buffer for storing said fetched instruction, an output of said instruction buffer being coupled to said extracting means.

9. The apparatus of claim 1 further comprising:

means for calculating an actual jump address by using said actual displacement value and said actual instruction length value;

means for determining if said actual jump address is in a current memory segment; and means for invalidating said assumed jump address if said actual jump address is not in said current memory segment.

10. The apparatus of claim 1 wherein said extracting means provides a fixed portion of said instruction as said assumed displacement value.

11. An apparatus for quickly determining actual jump addresses of taken jump instructions of a plurality of fetched instructions, comprising:

means for extracting a portion from each said fetched instruction, regardless of whether said fetched instruction is one of said jump instructions, said extracted portion representing an assumed displacement value;

means for storing at least a portion of a current instruction address;

means for providing a fixed assumed instruction length value;

means for adding said assumed displacement value, said fixed assumed instruction length value, and said at least a portion of a current instruction address to generate an assumed jump address;

means for determining a physical page of said current instruction address;

means for storing said physical page;

means for combining said physical page from said means for storing to said assumed jump address output by said means for adding:

means for decoding said fetched instruction to determine whether said fetched instruction is one of said jump instructions;

means for invalidating said assumed jump address if said decoding means determines that said fetched instruction is not one of said jump instructions;

means for determining an actual instruction length value and an actual displacement value if said decoding means determines that said fetched instruction is one of said jump instructions;

means for comparing said actual instruction length value and said actual displacement value to said fixed assumed instruction length value and said assumed displacement value, respectively;

means, responsive to said comparing means, for invalidating said assumed jump address if said actual instruction length value and said actual displacement value are not equal to said fixed assumed instruction length value and said assumed displacement value, respectively;

means, responsive to said comparing means, for determining if a jump will be taken if said actual instruction length value and said actual displacement value are equal to said fixed assumed instruction length value and said assumed displacement value, respectively;

means for invalidating said assumed jump address if said means for determining determines that said jump will not be taken; and means for using said assumed jump address as the actual jump address if said means for determining determines that said jump will be taken.

12. The apparatus of claim 11 further comprising means for invalidating said assumed jump address if there is a carry or borrow generated by said means for adding, indicating that said assumed jump address is in a different physical page from the page stored in said means for storing a physical page.

13. An apparatus for quickly determining actual jump addresses of taken jump instructions of a plurality of fetched instructions, comprising:

means for extracting a portion from each said fetched instruction, regardless of whether said fetched instruction is one of said jump instructions, said extracted portion representing an assumed displacement value;

means for storing at least a portion of a current instruction address;

means for providing a fixed assumed instruction length value;

means for adding said assumed displacement value, said fixed assumed instruction length value, and said at least a portion of a current instruction address to generate an assumed jump address;

means for determining a physical page of said current instruction address;

means for storing said physical page;

means for combining said physical page from said means for storing to said assumed jump address output by said means for adding;

means for invalidating said assumed jump address if there is a carry or borrow generated by said means for adding, indicating that said assumed jump address is in a different physical page from the page stored by said means for storing a physical page;

means for decoding said fetched instruction to determine whether said fetched instruction is one of said jump instructions;

means for invalidating said assumed jump address if said decoding means determines that said fetched instruction is not one of said jump instructions;

means for determining an actual instruction length value and an actual displacement value if said decoding means determines that said fetched instruction is one of said jump instructions;

means for calculating an actual jump address by using said actual displacement value and said actual instruction length value;

means for determining if said actual jump address is in a current memory segment;

means for invalidating said assumed jump address if said actual jump address is not in said current memory segment;

means for comparing said actual instruction length value and said actual displacement value to said fixed assumed instruction length value and said assumed displacement value, respectively, if said actual jump address is in said current memory segment;

means, responsive to said comparing means, for invalidating said assumed jump address if said actual instruction length value and said actual displacement value are not equal to said fixed assumed instruction length value and said assumed displacement value, respectively;

means, responsive to said comparing means, for determining if a jump will be taken if said actual instruction length value and said actual displacement value are equal to said fixed assumed instruction length value and said assumed displacement value, respectively;

means for invalidating said assumed jump address if said means for determining determines that said jump will not be taken; and means for using said assumed jump address as the actual jump address if said means for determining determines that said jump will be taken.

14. A method for quickly determining actual jump addresses of taken jump instructions of a plurality of fetched instructions, the method comprising the steps of:

extracting a portion from each said fetched instruction, regardless of whether said fetched instruction is one of said jump instructions, said extracted portion representing an assumed displacement value;

storing at least a portion of a current instruction address;

providing a fixed assumed instruction length value;

adding said assumed displacement value, said fixed assumed instruction length value, and said at least a portion of a current instruction address to generate an assumed jump address;

decoding said fetched instruction to determine whether said fetched instruction is one of said jump instructions;

if said decoding step determines that said fetched instruction is not one of said jump instructions, invalidating said assumed jump address;

if said decoding step determines that said fetched instruction is one of said jump instructions, determining an actual instruction length value and an actual displacement value;

comparing said actual instruction length value and said actual displacement value to said fixed assumed instruction length value and said assumed displacement value, respectively;

if said actual instruction length value and said actual displacement value are not equal to said fixed assumed instruction length value and said assumed displacement value, respectively, invalidating said assumed jump address;

if said actual instruction length value and said actual displacement value are equal to said fixed assumed instruction length value and said assumed displacement value, respectively, determining if a jump will be taken;

if said jump will not be taken, invalidating said assumed jump address; and if said jump will be taken, using said assumed jump address as the actual jump address.

15. The method of claim 14 wherein said step of adding comprises the steps of:

adding said assumed displacement value and said fixed assumed instruction length value to give a total value; and adding said total value and said current instruction address.

16. The method of claim 15 further comprising the step of performing sign extension on said total value.

17. The method of claim 14 further comprising the steps of:

determining a physical page of said current instruction address;

storing said physical page; and combining said physical page from said storing step to said assumed jump address output of said adding step.

18. The method of claim 17 further comprising the step of invalidating said assumed jump address if there is a carry or borrow generated by said adding, indicating that said assumed jump address is in a different physical page from the page stored in said step of storing a physical page.

19. The method of claim 14 further comprising the steps of:

fetching an instruction from a memory at said assumed jump address; and storing said fetched instruction.

20. The method of claim 15 further comprising the steps of:

calculating an actual jump address by using said actual displacement value and said actual instruction length;

determining if said actual jump address is in a current memory segment; and invalidating said assumed jump address if said actual jump address is not in said current memory segment.

* * * * *